Figure 1:
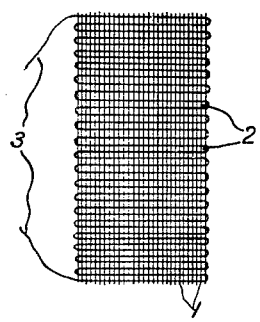

March 7, 1950  J. F. LEVERS ET AL  2,499,513
ELECTRICAL RESISTANCE ELEMENT
Filed April 3, 1946

J. F. LEVERS
R. V. PATCHETT
P. BOWLES
INVENTORS

ATTORNEY

Patented Mar. 7, 1950

2,499,513

UNITED STATES PATENT OFFICE 2,499,513

ELECTRICAL RESISTANCE ELEMENT

James Frederick Levers and Richard Vernon Patchett, Spondon, near Derby, and Percy Bowles, Chellaston, near Derby, England; said Levers and said Patchett assignors to British Celanese Limited, London, England, a corporation of Great Britain, and said Bowles assignor to Rolls-Royce Limited, Derby, England, a corporation of Great Britain Application April 3, 1946, Serial No. 659,210
In Great Britain April 12, 1945

8 Claims. (Cl. 201—63)

This invention relates to electrical resistance elements and particularly to elements of a kind adapted to be used as strain gauges for the testing of materials and articles by securing them to the surface of the material or article and observing the changes in the resistance of the element when the material or article, and consequently the element, is under strain.

In strain gauges of this kind, it is usually necessary to employ very fine resistance wire (e. g. of the order of 0.003" diameter or under) made of an alloy selected rather for its low specific electrical conductivity and low temperature coefficient of resistance than for its mechanical properties, in order to accommodate within a small area (say 1 square inch or less) a resistance high enough to constitute a gauge of the required sensitivity. Such wire, however, is delicate to handle, and not only is the making of strain gauges from it a laborious and expensive matter but also it is difficult to make gauges that are of uniform characteristics and able to give reliably reproducible results.

According to the present invention an electrical resistance element suitable for use as a strain gauge is in the form of a woven fabric comprising in the weft a resistance wire, and stiffened with an electrically non-conducting film-forming material which leaves unfilled interstices or voids extending through the fabric. The fabric is conveniently woven in the form of a ribbon of, say 1" in width, from which suitable lengths, e. g. 1" or ½" can be cut to form the gauges.

The resistance elements made in accordance with the present invention are very robust, simple to manufacture, and highly uniform, as between one element and another, in their electrical characteristics. Moreover, they are quickly and easily fixed to the surfaces to which they are to be secured when used in strain gauges. In particular, the presence of unfilled interstices in the fabric constituting the resistance element not only enables the element to be secured to a surface without danger of trapping air bubbles between the fabric and the surface but also enables the securing to be effected by means of a dope containing a volatile solvent, e. g. a nitrocellulose or cellulose acetate dope in which the principal solvent component is acetone. The interstices enable rapid drying of the volatile solvent to take place and permit the almost immediate use of the resistance as a strain gauge element.

The film-forming material employed for the purposes of the present invention may be applied to the woven fabric as a "dope," i. e. as a solution in a volatile solvent, the volatile solvent being subsequently evaporated. The amount of volatile solvent should be sufficient to give a dope of such viscosity, having regard to the nature of the fabric to which it is applied, as not to form a continuous film of solid material over the whole area of the fabric, but to leave unfilled the required voids or interstices in the stiffened fabric. Thus a ribbon containing, as the weft, a wire of 0.001" diameter or less may be run rapidly through a thin nitrocellulose dope, and the volatile solvent in the dope allowed to evaporate from the ribbon.

Alternatively the film-forming material may be included in the fabric structure, and then coalesced so as to stiffen the fabric, e. g. by treatment of the fabric with a solvent for the film-forming material. Thus a wire of 0.001" to 0.003" diameter, preferably already lapped with silk or other material incompatible with cellulose acetate, may be lapped before weaving with a thread of continuous cellulose acetate filaments, and the fabric treated with a solvent for cellulose acetate, such as acetone, so as to form a more or less continuous coating over the wire, and to bond the wire to the warp threads used in the fabric and so stiffen the fabric. If desired, these two expedients may be used in conjunction, a dope containing film-forming material being used to coalesce the film-forming material already incorporated in the fabric.

The use of a textile lapping on the wire, whether of silk or other non-thermoplastic filaments or of a film-forming substance such as cellulose acetate, or both, greatly increases the ability of the wire to withstand the stresses incidental to the weaving operation.

The invention is applicable to the production of resistance elements in which fine resistance wires, e. g. of the order of 0.003" diameter or less are employed. In the lapping of such wire, and especially of very fine wire of the order of 0.001" diameter and less, great care must be exercised to avoid imparting excessive tension to the yarn with which the wire is covered. If excessive tension is used the wire has a tendency to form a helix instead of being perfectly straight in the untensioned condition, an effect which renders the resulting product less suitable for use as a strain gauge in the testing of materials. If two layers of lapping are employed e. g. where a layer of filaments of film-forming material is superposed on a layer of silk, the two layers may be applied in separate lapping operations, or they may be applied in a single operation, the wire being run past two points at which the lappings are wound on in opposite directions. When extremely fine resistance wire is used, however, e. g. of less than 0.001" diameter, it is generally more convenient to apply only a single lapping, of material incompatible with the film-forming material to be used, and to apply the film-forming material to the fabric into which the wire is woven in the form of a dope as described above.

As the textile warp with which the resistance wire is woven, any warp that is of the requisite fineness, e. g. of less than 50 denier, and that is incompatible with the film-forming material, i. e. is not adversely affected by the film-forming material or the solvent therefor used to stiffen the fabric, may be employed. In order to achieve the necessary fineness, however, it is generally desirable to use a continuous filament yarn. Moreover, fineness of the individual filaments, as well as of the yarn as a whole, is desirable, for which reason it is convenient to employ a yarn of artificial continuous filaments that have been stretched to a high degree, e. g. to 5 or 10 times their original length, in the presence of an agent adapted to facilitate stretching. The stretching operation has the effect of greatly increasing the tensile strength of the filaments in terms of grams per denier, and also of increasing their fineness in accordance with the degree of stretch imparted. Thus, continuous filament yarns of cellulose acetate having a filament denier of 2-5 may be stretched in the presence of moist steam to 5, 10 or more times their original length and the resulting fine filaments, of 1 to 0.2 filament denier or less, may be further reduced in weight, without a corresponding diminution in their tensile strength, by saponifying the substance of the filaments. Stretched and saponified fine-filament yarns of this kind may also be used, instead of silk, as a lapping for the wire. For this purpose, however, it is preferable that, between the operations of stretching the filaments and saponifying them, they should be subjected to a shrinking treatment which, while slightly reducing their tenacity, increases their extensibility and facilitates the lapping operation.

Figure 2:
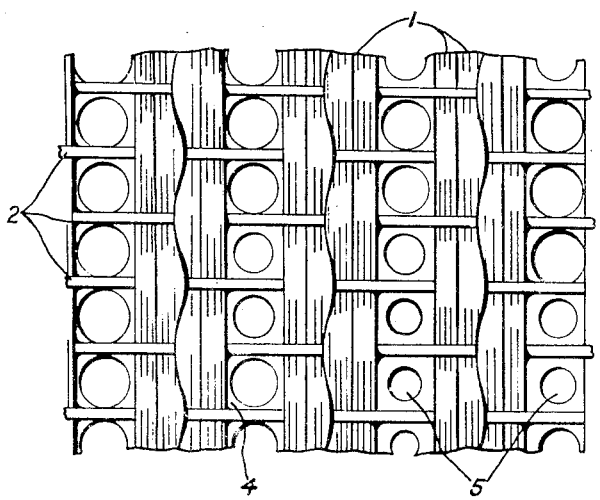

The accompanying drawings show diagrammatically a woven ribbon in accordance with the invention. In the drawings:

Figure 1 is a general representation of a short full width length of the ribbon, and Figure 2 is a view on a much enlarged scale of a small area of the ribbon.

As is shown in Figure 1, the ribbon consists of textile warp threads 1 interwoven with a continuous weft 2, consisting of a very fine resistance wire which has been lapped with a fine thread of silk or of cellulose acetate, the weft being continuous throughout the length of the ribbon so that the ends 3 thereof can be employed as terminals for the electrical resistance constituted by the length of ribbon.

Figure 2 shows the conformation and character of the ribbon in greater detail. The textile warp threads 1 are in groups of four, the warp having been drawn through the reed for the purpose of weaving at four ends per dent. The weave is a plain weave, except that two ends of warp are woven as one, each group of four warp threads constituting two such pairs of ends. The entire fabric is stiffened with an electrically non-conducting film-forming material 4, such as cellulose acetate or cellulose nitrate, which leaves unfilled interstices or voids 5 extending through the fabric in the spaces between the weft wires 2 and between the successive groups of four warp threads 1. The film-forming material is applied, as described in the ensuing examples, either as a lapping of filaments of a film-forming material, such as cellulose acetate, on the wire weft 2, or as a thin dope through which the ribbon is run after weaving. In the former case, the ribbon is run through a solvent for the fi. 1-forming material so as to coalesce the filaments with which the wire is lapped.

The following are given as examples of electrical resistance elements in accordance with the present invention and in conformity with the drawings.

*Example I*

A resistance wire of 0.001" diameter nickel-chrome wire is covered first with a silk lapping yarn of 20 denier at a take-up speed of 65 inches per minute and a spindle speed of 4,500 R. P. M., and then with a 42 filament 50 denier cellulose acetate yarn applied at the same spindle speed and with a take-up speed of 90 inches per minute (wound in the opposite direction). The covered wire is woven as weft at 100 picks per inch in a warp consisting of stretched and saponified continuous filament cellulose acetate yarns, 240 such yarns of 30 denier, and 0.4 filament denier being employed. The warp is drawn 4 ends per dent in a 60's reed, and is woven two ends as one, plain weave into a ribbon about one inch in width. The ribbon is rapidly passed through an acetone bath with the result that the cellulose acetate covering on the wire is softened and coalesces to form a protective film around the warp and weft. The warps appear in the fabric in groups of four, as they were drawn through the reed, and in the spaces between the groups and between the wefts appear interstices extending through the fabric and not filled with coalesced cellulose acetate. The coalesced ribbon is wound on spools for storage and may be used in short lengths, e. g. of the order of one inch, as strain gauges for the testing of materials or components. The resistance of the product is of the order of 4,200 ohms per square inch. In use, the short length of ribbon, after attachment of electrical connections to the ends of the wire incorporated therein, may be affixed to the surface of an element under test by means of a nitro-cellulose dope to which the cellulose acetate employed bonds readily.

*Example II*

The wire of Example I is covered in a single lapping operation in which two yarns are applied simultaneously and lapped in opposite directions, with 75 wraps per inch of 13 denier silk yarn and 50 wraps per inch of 50 denier 42 filament cellulose acetate yarn. The yarn is covered at a rate of 43 inches per minute, and the cellulose acetate yarn is applied over the silk yarn. The resulting wire is woven as weft at 100 picks per inch in a warp consisting of stretched and saponified continuous filament cellulose acetate yarns, each of 30 denier and of 0.4 filament denier. The yarns are twisted to 10 turns per inch and carry 7% of size. The warp comprises 264 of such yarns with a catch thread of two such yarns doubled together on each side of the warp. The warps are drawn, as in Example I, 4 ends per dent in a 60' reed, and are woven two ends as one, plain weave. The resulting ribbon is coalesced as in Example I, and is stored and used in the same way.

*Example III*

A "Constantan" (copper-nickel) wire of a diameter of 0.0012" is substituted for the nickel-chrome wire of Example II, the other details of Example II being followed. The resulting ribbon, which may be employed in the same way as that of Examples I and II, has a total resistance of about 1,500 ohms per square inch.

*Example IV*

A nickel-chrome wire of 0.0006" diameter is covered with a single layer of silk yarn of 13 denier, 75 wraps per inch. The covered wire is woven at 120 picks per inch into the warp described in Example II, and the resulting ribbon is passed through a dope of the following composition:

| | | |
|---|---|---|
| Nitro-cellulose (low viscosity) | grams | 15 |
| Camphor | do | 15 |
| Acetone | cc | 425 |
| Alcohol | cc | 25 |
| Amyl acetate | cc | 25 |

After running through the dope, the ribbon is allowed to dry and may be used in the same way as the ribbons of Examples I–III. The total resistance of this ribbon is about 15,000 ohms per square inch.

Having described our invention, what we desire to secure by Letters Patent is:

1. An electrical resistance element adapted to be used as a strain gauge, said element being in the form of a woven fabric comprising a textile warp consisting of yarns of continuous high tensile cellulose filaments and comprising, in the weft, a resistance wire lapped with a textile thread, said fabric being stiffened with an electrically non-conducting film-forming material which leaves unfilled interstices or voids extending through the fabric.

2. An electrical resistance element adapted to be used as a strain gauge, said element being in the form of a narrow woven ribbon comprising a warp of yarns having a denier less than 50 and consisting of continuous high tensile cellulose filaments, and comprising a weft of resistance wire of a diameter less than 0.003" lapped with a continuous filament textile thread, said ribbon being stiffened by impregnation with an electrically non-conducting film-forming material which is incompatible with the material of said thread and leaves unfilled interstices or voids extending through the ribbon.

3. An electrical resistance element adapted to be used as a strain gauge, said element being in the form of a woven ribbon of about 1" in width comprising a warp of 240 stretched and saponified continuous filament cellulose acetate yarns of 30 denier and 0.4 filament denier arranged in the fabric in groups of 4 slightly spaced from each other, and woven two ends as one in a plain weave with 100 picks per inch of a weft consisting of a nickel-chrome resistance wire of 0.001" diameter covered first with a silk lapping yarn of 20 denier and then with a 42 filament 50 denier yarn of cellulose acetate wound in the opposite direction, said cellulose acetate being coalesced to form a protective film around the warp and weft and to leave, between the groups of warps and between the wefts, interstices extending through the ribbon and not filled with coalesced cellulose acetate.

4. An electrical resistance element adapted to be used as a strain gauge, said element being in the form of a woven ribbon of about 1" in width comprising a warp of 264 stretched and saponified continuous filament cellulose acetate yarns of 30 denier and 0.4 filament denier and two such yarns doubled together on each side of the warp, said yarns being arranged in the fabric in groups of 4 slightly spaced from each other and being woven two ends as one in a plain weave with 100 picks per inch of a weft consisting of a copper-nickel resistance wire of a diameter of 0.0012" lapped first with a silk lapping yarn of 20 denier and then with a 42 filament 50 denier yarn of cellulose acetate wound in the opposite direction, said cellulose acetate being coalesced to form a protective film round the warp and weft and to leave, between the groups of warps and between the wefts, interstices extending through the ribbon and not filled with coalesced cellulose acetate.

5. An electrical resistance element adapted to be used as a strain gauge, said element being in the form of a woven ribbon of about 1" in width comprising a warp of 264 stretched and saponified continuous filament cellulose acetate yarns of 30 denier and 0.4 filament denier and two such yarns doubled together on each side of the warp, said yarns being arranged in the fabric in groups of 4 slightly spaced from each other and woven two ends as one in a plain weave with 120 ends per inch of a nickel-chrome resistance wire of 0.0006" diameter covered with a single layer of silk yarn of 13 denier, said ribbon being stiffened by impregnation with a nitrocellulose dope which, after drying leaves, between the groups of warps and between the wefts, interstices or voids extending through the ribbon and not filled with coalesced cellulose acetate.

6. A method of making an electrical resistance element suitable for use as a strain gauge, said method comprising lapping a resistance wire with a yarn containing fibers of an electrically non-conducting film-forming material, weaving the lapped wire as weft into a fabric and then coalescing said film-forming material so as to stiffen the fabric.

7. A method of making an electrical resistance element suitable for use as a strain gauge, said method comprising lapping a resistance wire with a yarn containing fibers of an electrically non-conducting film-forming material, weaving the lapped wire as weft into a fabric and applying to the woven fabric a volatile solvent for said film-forming material and then evaporating the volatile solvent from the fabric so as to coalesce said film-forming material and to stiffen the fabric.

8. A method of making electrical resistance elements suitable for use as strain gauges, said method comprising lapping a resistance wire first with a textile yarn and then with a yarn containing fibers of an electrically non-conducting film-forming material incompatible with the material of said textile yarn, weaving the lapped wire as weft into a fabric, applying to the woven fabric a volatile solvent for said film-forming material and then evaporating the volatile solvent from the fabric so as to coalesce said film-forming material and to stiffen the fabric.

JAMES FREDERICK LEVERS.
RICHARD VERNON PATCHETT.
PERCY BOWLES.

(References on following page)

REFERENCES CITED

The following references are of record in the file of this patent:

UNITED STATES PATENTS

| Number | Name | Date |
|---|---|---|
| 1,031,204 | Schniewindt | July 2, 1912 |
| 1,036,632 | Jahr | Aug. 27, 1912 |
| 1,578,326 | Larson | Mar. 30, 1926 |
| 1,963,554 | McDill | June 19, 1934 |
| 2,175,893 | Hill | Oct. 10, 1939 |

FOREIGN PATENTS

| Number | Country | Date |
|---|---|---|
| 1,765 | Great Britain | July 20, 1860 |